No. 771,456. PATENTED OCT. 4, 1904.
A. E. BRILLIE.
SUSPENSION DEVICE FOR DIFFERENTIAL GEARING.
APPLICATION FILED DEC. 29, 1903.
NO MODEL. 2 SHEETS—SHEET 1.

Witnesses:

Inventor:
Auguste Eugène Brillié
by Geo zu Massie
his Attorney

No. 771,456. PATENTED OCT. 4, 1904.
A. E. BRILLIÉ.
SUSPENSION DEVICE FOR DIFFERENTIAL GEARING.
APPLICATION FILED DEC. 29, 1903.
NO MODEL. 2 SHEETS—SHEET 2.
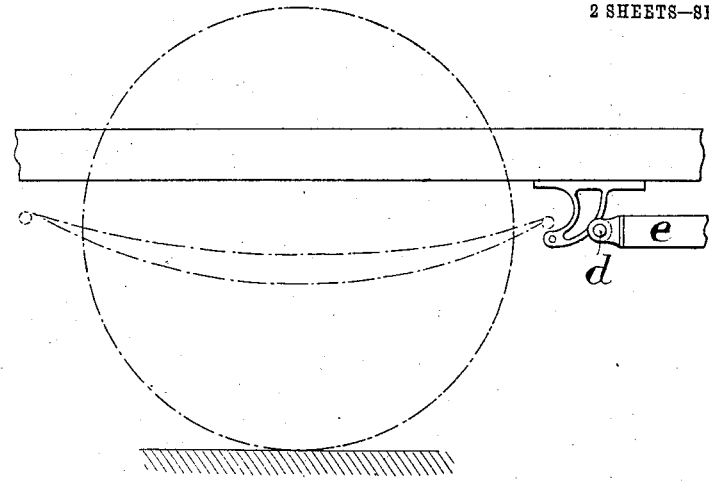
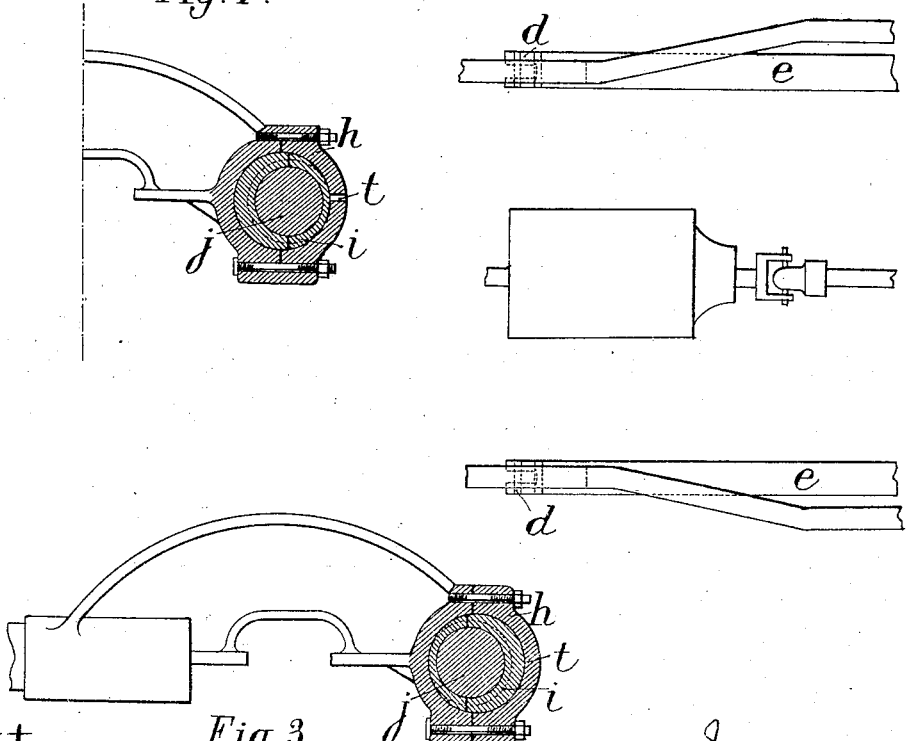
Fig. 4.
Fig. 3.
Witnesses:
Inventor:
Auguste Eugène Brillié
by Georgii + Massié
his attorneys No. 771,456.

Patented October 4, 1904.

UNITED STATES PATENT OFFICE.

AUGUSTE EUGÈNE BRILLIÉ, OF PARIS, FRANCE.

SUSPENSION DEVICE FOR DIFFERENTIAL GEARING.

SPECIFICATION forming part of Letters Patent No. 771,456, dated October 4, 1904.

Application filed December 29, 1903. Serial No. 186,974. (No model.)

*To all whom it may concern:*

Be it known that I, AUGUSTE EUGÈNE BRILLIÉ, of No. 20 Avenue Bosquet, Paris, in the Republic of France, have invented a certain new and useful Suspension Device for Differential Gearing; and I do hereby declare the following to be a full, clear, and exact description of the invention, such as will enable others skilled in the art to which it appertains to make and use the same.

The present invention relates to a method of suspension of the differential shaft of automobile vehicles and to a contrivance for connecting this shaft with the driving-axle.

The invention is applicable to a known system of transmission, which consists in operating the driving-wheels by means of pinions gearing with annular teeth formed in one with the driving-wheels, the differential gear being mounted on two subframes, of which one end is fixed relatively to the motor-shaft and the other is movably mounted upon the frame. Instead of mounting the differential mechanism on two frames of fixed length, a disadvantageous arrangement from the point of view of convenience and which also does not lend itself to permit changes of speed-gear between the differential shaft and the driving-wheel, in the present improved contrivance a support is provided for each extremity of the differential shaft, one end of the device being connected with the driving-shaft by means of a collar surrounding the axle and an eccentric bush and the other carrying a support for the differential shaft. By this means we have not only reduced the weight, but obtained a means of modifying or regulating the distance between the axis of the differential mechanism and the axis of the wheels which, while retaining the same toothed drum, allows a variation to be made in the number of teeth of the pinions gearing with this drum.

The accompanying drawings show as a representative example a practical form of construction for carrying out this invention.

Figure 1:
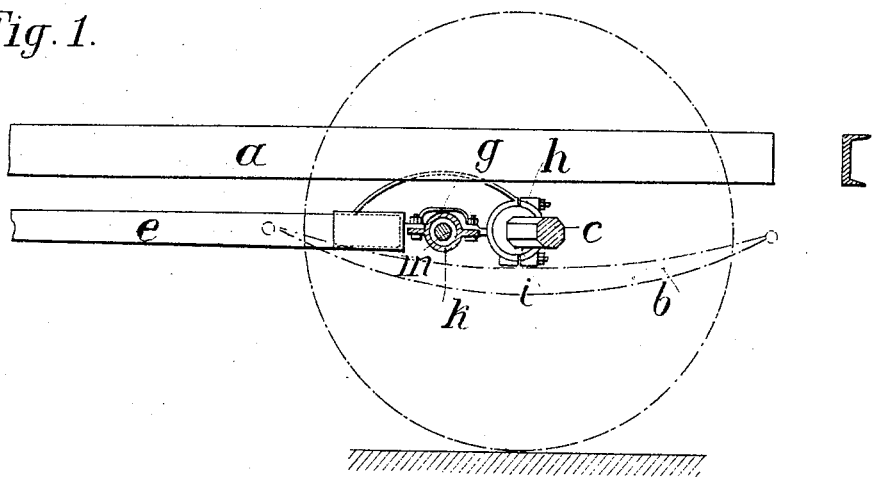
Figure 2:
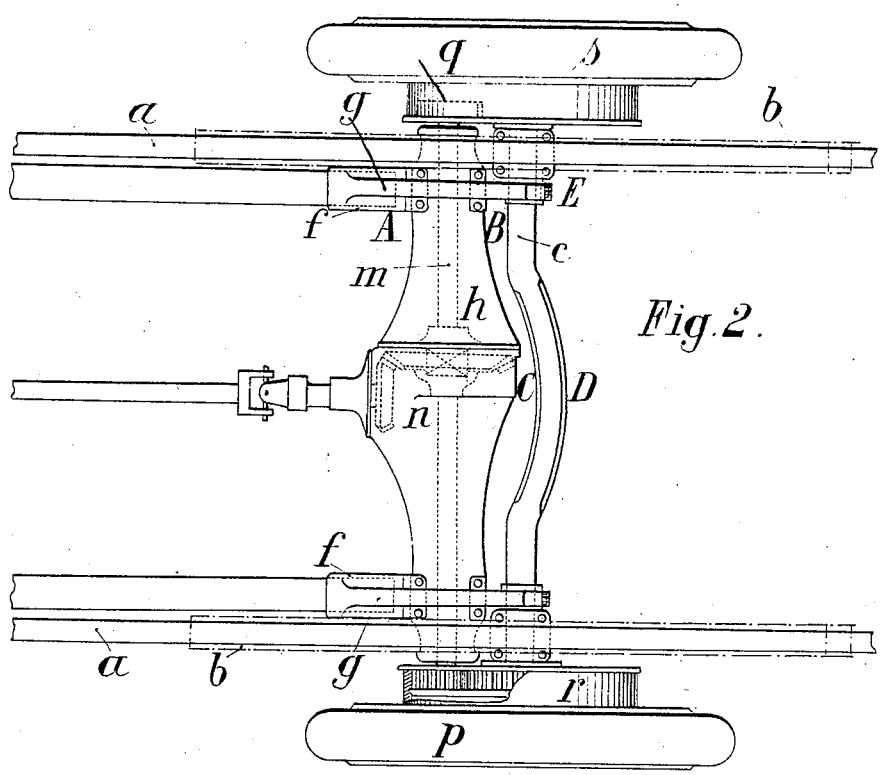

In the drawings, Figure 1 is a longitudinal section. Fig. 2 is a plan. Fig. 3 is a vertical section of a portion of the contrivance, taken along the line A B E of Fig. 2, the parts being suitably adjusted for the largest-sized pinion; and Fig. 4 is a similar section of a portion of the latter in which the parts are adjusted for a pinion of the smallest size.

In the figures, $a\ a$ are two beams forming part of the frame of the vehicle, to which are attached in any known manner the springs $b$, which support the rear or driving axle $c$. To brackets $d$, secured to these beams, are jointed the ends of special shafts $e$. The other ends of these shafts terminate in an arched bearing-block $g$, which on the one side forms a socket at $f$ for inclosing and holding in position the shaft $e$ itself and on the other side is terminated at its free end by a collar $h$. This latter contains an eccentric bush $i$, made in two pieces, which inclose one on each side the two necks $j$ of the axle $c$.

The arch $g$ gives passage and support to the casing $k$, which contains the differential mechanism. From the two extremities of the casing $k$ emerge the differential shafts $m$ $n$, to which are secured, respectively, the pinions $p$ and $q$, which gear with the internal teeth of the drums $r$ and $s$ of the driving-wheels.

The eccentric bushes $i$ are secured in their respective collars, first of all by the grip of the collar and also by a projection $t$, forming part of the collar, which enters one of the cavities formed in the disk. The number of cavities can be variable and can correspond to the necessary position for the true adjustment to suit the number of the teeth of the pinion and drum, this position depending on the number of teeth in the pinion.

Having thus fully described my invention, what I claim as new, and desire to secure by Letters Patent, is—

1. The combination, with a driving-axle, a differential shaft, and a bearing therefor, of a suspension device secured intermediate its length to the bearing, a collar carried by one end of the device for engagement with the driving-axle, and a connection between the other end of the device and a fixed support.

2. The combination, with a driving-axle, a differential shaft, and a bearing therefor, of a suspension device secured intermediate its length to the bearing, a collar carried by one end of the suspension device for engagement with the driving-axle, an eccentric bush arranged between the collar and driving-axle, and a connection between the other end of the device and a fixed portion of the machine.

3. The combination, with a driving-axle, a differential shaft, and a bearing therefor, of a suspension device secured intermediate its length to the bearing, a collar carried by one end of the suspension device for engagement with the driving-axle, an eccentric bush arranged between the collar and driving-axle, means for adjusting the position of the bush relative to the collar and axle, and a connection between the other end of the device and a fixed portion of the machine.

4. The combination, with a driving-axle, a differential shaft, and a bearing therefor, of a suspension device secured intermediate its length to the bearing, a collar carried by one end of the device for engagement with the driving-axle, an eccentric bush arranged between the collar and driving-axle, a connection between the other end of the device and a fixed portion of the machine, and a supporting-arch extending over the bearing and connecting the two portions of the device.

5. The combination, with a driving-axle, a differential shaft, and a bearing therefor, of a suspension device secured intermediate its length to the bearing, a collar carried by one end of the device for engagement with the driving-axle, an eccentric bush arranged between the collar and driving-axle, a connection between the other end of the device and a fixed portion of the machine, and an arch connecting the two extremities of the device.

6. The combination, with a driving-axle, a differential shaft, and a bearing therefor, and a suspension device secured intermediate its length to the bearing, a collar carried by one end of the device for engagement with the driving-axle, an eccentric bush arranged between the collar and driving-axle, means for adjusting the position of the bush relative to the collar and axle, a sleeve carried by the other end of the device, a bar connected at one end with the sleeve and at the other end with a fixed portion of the machine, a supporting-arch extending over the bearing and connecting the two portions of the device, and a second arch connecting the two extremities of the device.

In witness whereof I have hereunto set my hand in presence of two witnesses.

AUGUSTE EUGÈNE BRILLIÉ.

Witnesses:
 RENÉ LAËNNER,
 LOUIS GARDET.